United States Patent [19]

Accousti

[11] Patent Number: 5,311,712
[45] Date of Patent: May 17, 1994

[54] BUILDING WITH CASING SYSTEM CONSTRUCTION AND CONSTRUCTION METHOD THEREOF

[76] Inventor: William J. Accousti, 775 Shuttle Meadow Rd., Southington, Conn. 06489

[21] Appl. No.: 666,853

[22] Filed: Mar. 8, 1991

[51] Int. Cl.⁵ .............................................. E04B 1/00
[52] U.S. Cl. ...................................... 52/259; 52/270; 52/293.1; 52/269; 52/415
[58] Field of Search ................. 52/234, 250, 259, 262, 52/265, 442, 421, 580, 267, 269, 270, 271, 2284, 292, 785, 802, 809, 810, 293, 589, 743, 268, 274, 415

[56] References Cited

U.S. PATENT DOCUMENTS

| | | | |
|---|---|---|---|
| 3,315,424 | 4/1967 | Smith | 52/267 X |
| 3,712,004 | 1/1973 | Loebsack | 52/270 X |
| 4,104,837 | 8/1978 | Naito | 52/743 X |
| 4,187,655 | 2/1980 | Anderson | 52/580 X |
| 4,222,208 | 9/1980 | Ferver | 52/293 X |
| 4,461,130 | 7/1984 | Shubow | 52/259 X |
| 4,464,873 | 8/1984 | Geiger | 52/293 |
| 4,467,859 | 8/1984 | Carroll et al. | 52/580 X |
| 4,615,155 | 10/1986 | Chamberlain | 52/270 X |
| 4,628,650 | 12/1986 | Parker | 52/269 X |
| 4,805,366 | 2/1989 | Long | 52/268 X |
| 4,858,398 | 8/1989 | Ricchim | 52/293 X |
| 5,050,358 | 9/1991 | Vladislavic | 52/250 X |

FOREIGN PATENT DOCUMENTS 1304141 8/1962 France ................................. 52/580

Primary Examiner—Carl D. Friedman
Assistant Examiner—Lan M. Mai
Attorney, Agent, or Firm—John J. Daniels

[57] ABSTRACT

The present inventive building and the construction method thereof uses a joined-and-filled-in-situ casing system from which to provide the foundation, exterior walls and interior walls of a structure using materials that are high strength, extremely durable, highly insulating and fire-retardant. The present inventive building and the construction method thereof provides a solution to the excessive wastes generated during conventional construction methods by utilizing construction materials that are recycled by being shredded and used as insulating fill. The present inventive building and construction method thereof incorporates an improved electrical wiring system that is particularly suited to the above casing system. The inventive wiring system provides an improved gang-box and wire conduit means that is much easier to install than convention wiring methods. Live wires are encapsulated in a substantially fire-proof medium, and the location of wiring within walls is consistent and hence predictable.

9 Claims, 14 Drawing Sheets

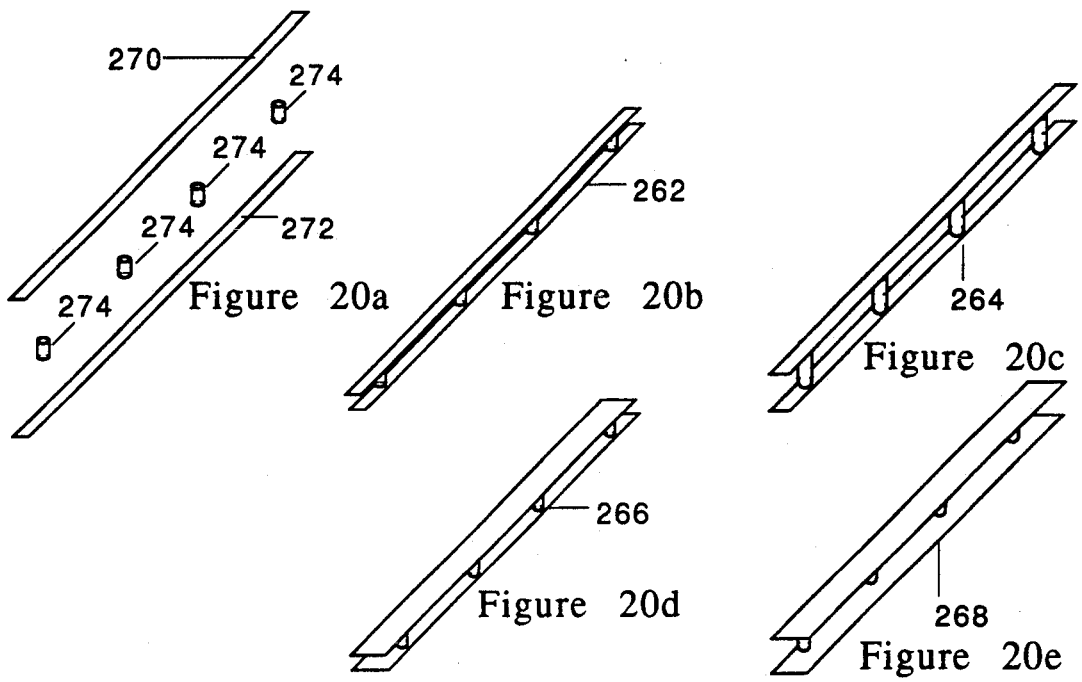
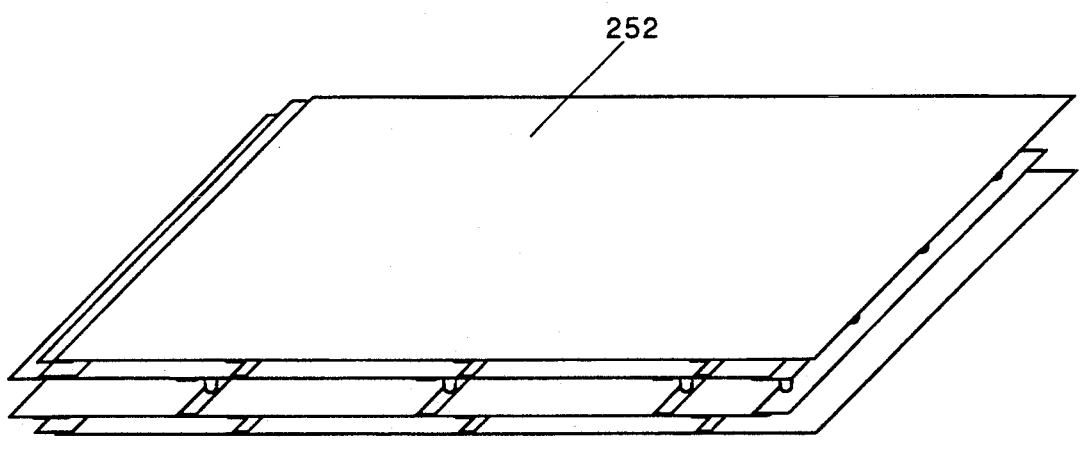
Figure 21
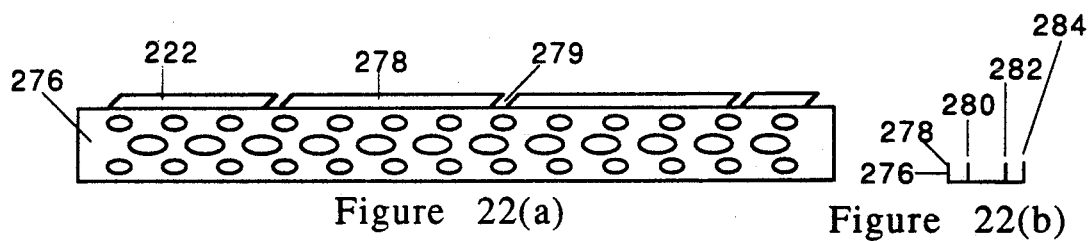

BUILDING WITH CASING SYSTEM CONSTRUCTION AND CONSTRUCTION METHOD THEREOF

TECHNICAL FIELD

The present invention relates to an easy to construct, energy efficient, environmentally sound, and costs-saving building and a construction method thereof. More particularly, the present invention relates to a building and construction method thereof using a system from which is constructed a moisture-proof foundation, energy efficient and durable exterior walls, and load bearing and/or sound-damping interior walls. The present invention includes an improved electrical wiring system that is particularly suited to the inventive building construction system.

BACKGROUND

One of the necessities of life is shelter and as a result building construction has traditionally been an enormous and important industry. However, the basic construction method of building a timber framed dwelling has changed relatively little over the many years it has been employed. Changes may take the form of improvements in the tools used, such as pneumatic nail guns replacing the traditional hammer and nail. But in general, substantially the same wood-product based materials and labor intensive timber frame construction dominate the field of building. Consequentially, newly constructed timber framed structures offer only slight structural improvements over structures built years before.

For many decades there was no real impetus to the building industry to devise improvements. Energy and labor costs were stable and the natural resources from which wood-product based materials are derived were thought to be plentiful and nearly inexhaustible. In recent years however, an urgent need has been recognized for improvements to construction. The disadvantages of employing inefficient material and labor usage have become magnified due to the sharply increasing costs of labor, energy, and wood products. It has also become apparent in recent years that the excessive use of wood products may have severely detrimental environmental consequences.

Also, there are many instances where sturdy shelter is required but the construction of conventional timber frame structures is impracticable, such as during military operations, after a natural disaster, or the like. In these instances a fast, durable and easy to construct structure that provides adequate shelter is desirable. The alternatives have been to use tents or prefabricated structures. Tents are usually a dismal failure because they provide only minimum protection from exposure and are prone to collapse. Prefabricated structures are also often inadequate because they are bulky and difficult to transport.

There is also an increasingly pressing demand for adequate shelter in areas where conventional construction is not feasible. Such is the case in poorer countries, or areas where wood-products are not readily available. Dwellings built in these areas are generally relatively primitive, labor intensive, and poorly constructed earthen or brick structures.

Traditional construction methods require many skilled and semi-skilled man hours. Special skills and tools are required for a multitude of construction steps. This has resulted in the specialization of workers in the construction trade. For example, it is common for separate crews with multitudes of workers to be employed to build the foundation, erect the decking and timber frame, hang the windows and doors, install the wiring, install the plumbing, hang the sheet-rock, paint the exterior walls, hang the exterior sheathing, hang the exterior finishing surface, paint the interior of the building, and various other specialized tasks.

The inefficiencies of such a process are numerous. Many workers must be employed and many man hours spent to complete all the conventional construction steps resulting in inflated building costs and excessive time to construct a building. Often a crew that is assigned to one of the construction steps is delayed and idled while the crew that performs the construction step that precedes it finishes its job behind schedule.

In addition to the excessive labor costs, a tremendous amount of wood-products are used to construct conventional buildings. It has been recognized that the overwhelming use of wood-products and the resulting deforestation to obtain these products is environmentally questionable. The cost of these wood-product based materials has continued to rise. The extensive use of wood products for structural members makes a structure susceptible to catastrophic failures due to termites, fire, rot, etc.

Another great disadvantage of conventional construction methods is the inefficient use of materials. Such methods produce a vast amount of scrap and waste material that must be carted away and disposed of in ever-dwindling land fill space. This inefficient use of construction materials is not only environmentally unsound, it also tends to greatly increases the cost of new construction.

Although skyrocketing heating and cooling costs have resulted in attempts at better insulated new construction, the traditional timber framed building still has poor insulating qualities. This drawback is inherent in traditional construction for a variety of reasons. For example, wood has a tendency to expand and contract in response to climatic changes. This causes warpage which creates gaps and makes drafts in traditionally constructed buildings inevitable. Modern ventilation, heating and cooling systems have been developed for the very efficient regulation of air quality and temperature in substantially air-tight structures. Unfortunately for traditionally constructed buildings, the efficiency of these systems depends on a substantially air-tight structure.

The electrical wiring of a conventionally constructed building has changed very little since it was first incorporated into new construction. There have been improvements in the wiring itself such as plastic sheathed wiring replacing metal sheath, but the method of installation remains virtually unchanged. Wiring is snaked through holes bored into the timber framed walls before the sheet-rock is hung. The wiring is terminated at locations where switches or outlets are desired. Among the disadvantages of this method is that there is no easy way to know where the wires are once the sheet-rock has been hung. This deficiency can have grave consequences to an unsuspecting homeowner who happens upon a live wire when drilling or hammering into a wall.

Generally, a conventional method of constructing a building begins with the construction of a foundation.

To construct a conventional foundation requires many steps such as: (i) excavating an area for the foundation, (ii) pouring concrete for the foundation footing, (iii) constructing forms for a foundation wall on both sides of the foundation footing after the setting thereof, (iv) pouring concrete into the forms, (v) removing the forms after the concrete has set, (vi) carrying fill into the excavated area to form a base for pouring concrete for a concrete floor, (vii) pouring concrete for the concrete floor, and (viii) back filling around the perimeter of the foundation.

Conventional foundations are expensive to build especially because of the time and labor required in setting up construction forms, waiting for the cement to set, then removing the forms before moving on to the next step. These foundations are also prone to leaks due to ground water and storm runoff seeping through the inevitable cracks that form in the foundation's concrete walls and floor.

After the foundation has been constructed, the next step in a conventional building construction method is to build a conventional decking supported by the foundation. Next, it is preferable to lay out a covering over the conventional deck to act as a vapor barrier and provide insulation. Typically, this covering is a red-rosen paper or the like. Next a timber frame defining the exterior walls of the structure is erected. Individual segments of lumber are cut to size and nailed together to form a structural frame. Frames for windows and doors are included in the exterior wall frame. The next step in the construction of a conventional building is to hang the doors and windows in the frames built into the exterior wall frame. The next step is to erect timber frames defining the interior wall structures. As with the exterior wall frame, a multitude of individual segments of lumber are cut and nailed together to form a structural frame. Frames for doors are built into the interior wall frames and the interior doors are hung.

The next step in a conventional construction method is to construct a conventional roof supported by the exterior walls and load-bearing interior walls. Next a sheathing material, such as plywood, is hung on the outer side of the exterior wall frame to create the exterior wall surfaces of the building. The next step in a conventional construction method is known generally as roughing, to run electrical wiring and plumbing under and through the conventional decking and within the exterior wall frames and interior wall frames, terminating the electrical wires and pipes at roughly where switches, electrical outlets, and plumbing fixtures of the finished building will be. Next insulation is installed, such as sheets of fiberglass between the studs making up the exterior wall frames.

The next step in a conventional construction method is to hang an interior wall material such as sheet-rock on the inner side of the exterior wall frame and both sides of the interior wall frames to create the interior wall surfaces of the building. After the interior wall surfaces have been hung, the next step is to tape the joints between the sections of hung sheet-rock. Taping includes the steps of applying a paper tape to cover the joint and smoothing a thin layer of joint compound material over the tape, thus creating a smooth and continuous surface spanning the length of each interior wall.

While the inside work is being done, the outside finished surface of the building is secured to sheathing hung on the exterior walls. This outside surface is typically clap-board, brick-face, aluminum siding or the like. Finally, the interior and exterior surfaces are primed and painted and the scrap generated during the construction is hauled away.

Conventional construction methods have many drawbacks. Labor costs due to many man-hours and specialized crews, material costs, wastes generated, excessive use of limited natural resources, inherently poor insulation qualities of the structure, excessive time to construct, etc., make conventional construction methods inefficient at best. The wastes generated by conventional construction methods place an increasing burden on limited land fill space. The extensive use of wood products for framing lumber, sheathing material and the like by conventional construction methods results in a structure that is difficult to insulate and is prone to drafts and catastrophic failure.

SUMMARY OF THE INVENTION

The present invention is intended to provide a remedy. It uses a joined-and-filled-in-situ casing system from which to provide the foundation, exterior walls and interior walls of a structure using materials that are high strength, extremely durable, highly insulating and fire-retardant. The present invention provides a solution to the excessive wastes generated during conventional construction methods by utilizing construction materials that are recycled by being shredded and used as insulating fill. The present invention incorporates an improved electrical wiring system that is particularly suited to the above casing system. The inventive wiring system provides an improved gang-box and wire conduit means that is much easier to install than conventional wiring methods. Live wires are encapsulated in a substantially fire-proof medium, and the location of wiring within walls is consistent and hence predictable.

The present invention solves the problem of how to provide a structure and the construction method thereof which is structurally stronger, uses less time and less labor (both skilled and unskilled), has a higher R value, produces less waste, uses environmentally sound materials, and is less expensive than similar structures built by conventional construction methods. The present invention can be substantially built by individuals, such as homeowners, who have little or no experience in construction, or by an experienced crew using less man hours and without the necessity for a multitude of specialized workers. The present invention is substantially air-tight and can efficiently utilize the advantages of a modern ventilation, heating and cooling system.

BRIEF DESCRIPTION OF THE DRAWINGS

FIG. 20a is an exploded perspective view of a structural rib;

FIG. 20b is a perspective view of an outer structural rib;

FIG. 20c is a perspective view of an inner structural rib;

FIG. 20d is a perspective view of an outer connecting structural rib;

FIG. 20e is a perspective view of an inner connecting structural rib;

FIG. 21 is a perspective view of an assembled individual exterior wall casing depicted in FIG. 19;

FIG. 22(a) is a perspective view of a bottom structural member of an individual casing;

FIG. 22(b) is a side view of a bottom structural member of an individual casing;

DETAILED DESCRIPTION OF THE DRAWINGS

Figure 1:
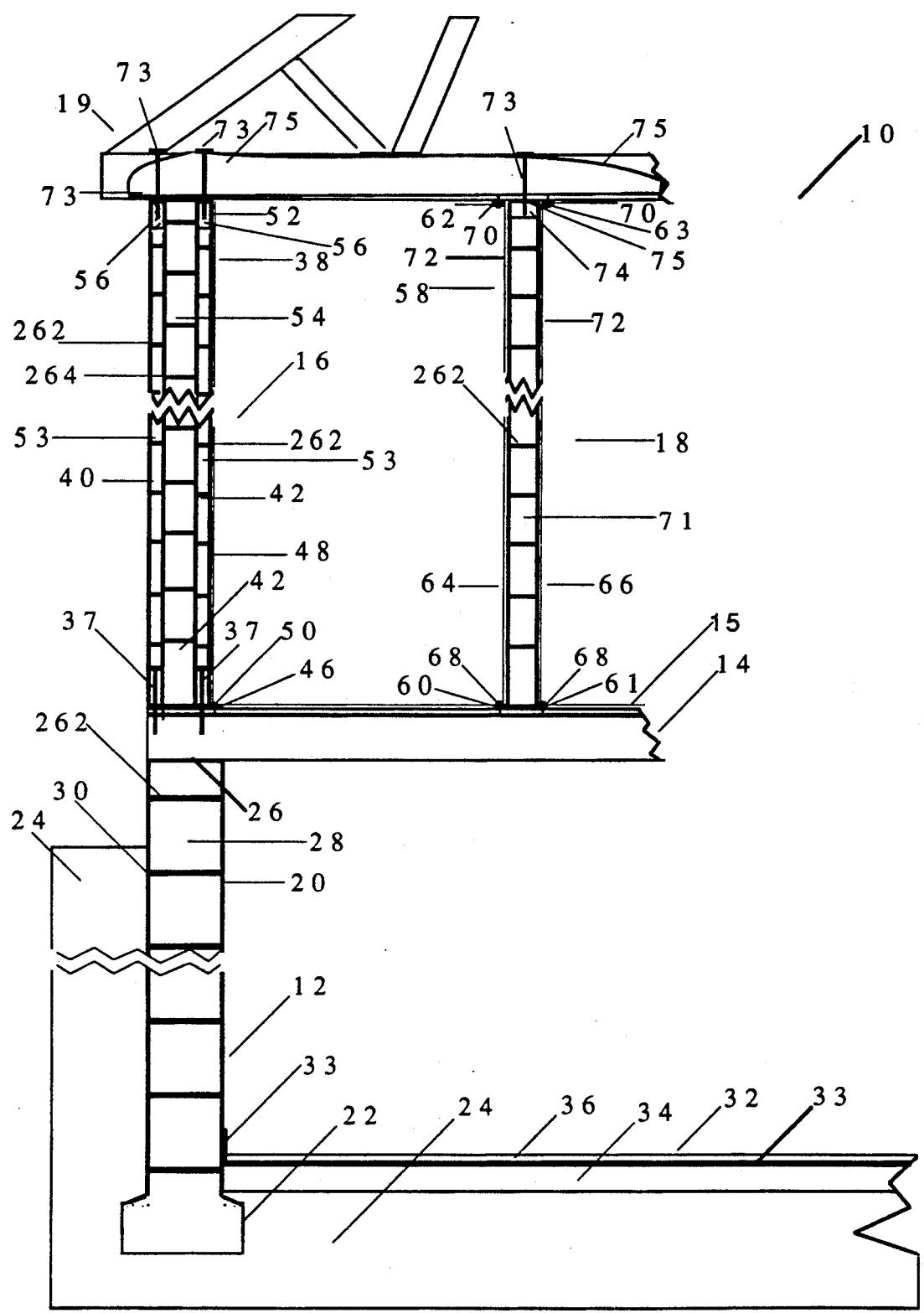
FIG. 1 is a cross-sectional view of the inventive building.

Referring to FIG. 1, inventive building system 10 includes a foundation system 12 upon which conventional deck 14 is supported. Conventional deck 14 in turn supports exterior wall system 16 and interior wall system 18. Foundation system 12 includes a plurality of foundation casings 20 which are rigid hollow forms, preferably made of a durable rigid plastic such as polystyrene, having a substantially inverted T-shaped cross section so that base 22 of foundation casing 20 acts to anchor foundation 12 in earth 24. The end of foundation casing 20 opposite base 22 defines opening 26 into which a load bearing material such as concrete 28 is poured. After concrete 28 has hardened, earth 24 is back-filled against the exterior surface 30 of foundation 12 and base 22 in a conventional manner. To make basement floor 32 of inventive building 10, a layer of fill material such as crushed stone 34 is deposited over earth 24. Plastic liner 33 is adhered to foundation casing 20 and covers crushed stone 34 to create a moisture-proof barrier that is integral with the moisture-proof barrier created by the walls of foundation system 12. Concrete floor 36 is poured and smoothed in a conventional manner.

Figure 6:
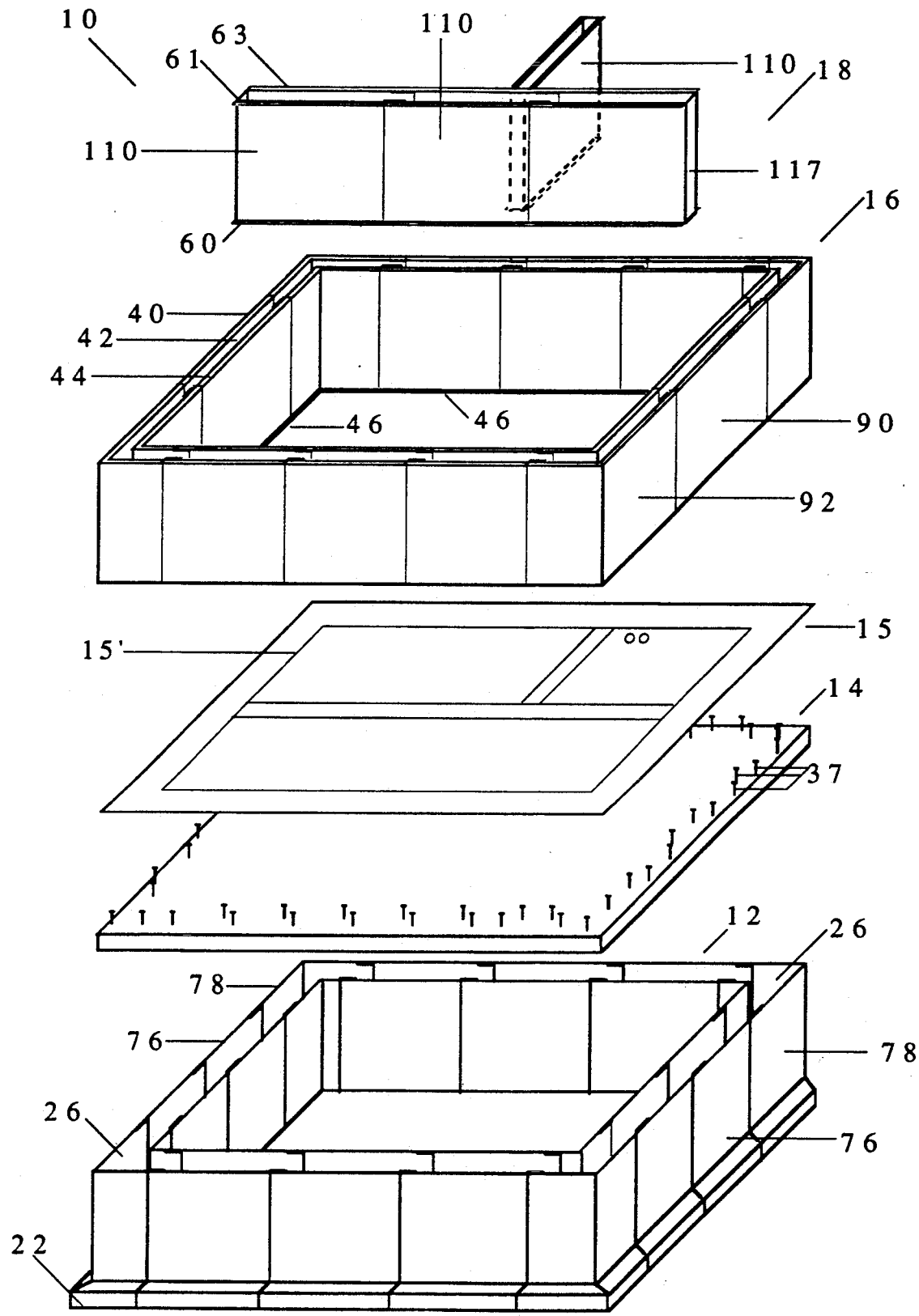
FIG. 6 is a perspective view of an exploded schematic representation of the inventive building.

Conventional deck 14 is built on and supported by foundation system 12 and plurality of spikes 37 are secured along the perimeter of conventional deck 14. A deck covering of red-rosen paper 15 or the like may be laid over conventional decking. In the preferred embodiment of the present invention, red-rosen paper 15 is imprinted with a floor plan showing placement of exterior wall system 16, interior wall system 18, plumbing, etc. to aid in the construction of the inventive building (as shown in FIG. 6).

Figure 13:
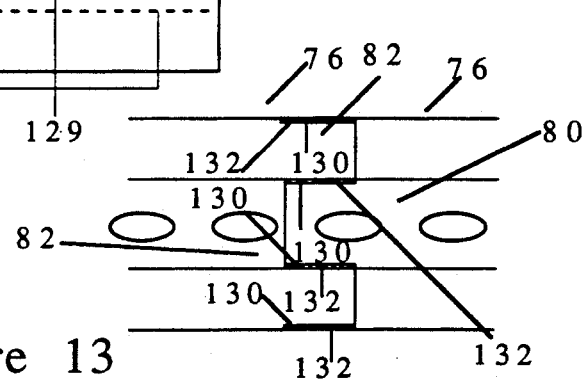
FIG. 13 is a top plan cut away view of a male joining section and female joining section of two foundation casing members joined together.

Exterior wall system 16 includes a plurality of exterior wall casings 38 which are rigid hollow forms, preferably made of a durable rigid material such as polystyrene, aluminum, corrugated cardboard, wood, or the like, and have a substantially rectangular cross section. Preferably, exterior wall casing 38 is partitioned into three sections, exterior section 40, middle section 42, and interior section 44. Exterior wall casing 38 is held in place during its construction by nailing strip 46 which runs the length of exterior wall casing 38 and along the bottom of interior surface 48 and is nailed to conventional deck 14 by a plurality of nails 50. Interior surface 48 may be covered by an interior wall surface such as layer of gypsum paper 52 or the like. Base 46 of exterior wall casing has plurality of holes 122 (FIG. 13). Some of holes 122 are each positioned and dimensioned to accept one of plurality of spikes 37 secured along the perimeter of conventional deck 14. A load bearing material, such as light-weight concrete 53 is poured into exterior section 40 and interior section 44, fills in around spike 37, and hardens thus anchoring exterior wall 16 to conventional deck 14. Middle section 42 is filled with an insulating material such as a hardenable foam insulation 54. Two 2"×4" segments of lumber 56 run the length of exterior section 40 and interior section 44 and are set into light-weight concrete 53 before it hardens. 2"×4" segments of lumber 56 provide a nailing structure for nails 73 that attach conventional roof 19.

Interior wall 18 includes a plurality of interior wall casing 58 which are rigid hollow forms, preferably made of a durable rigid material such as polystyrene, aluminum, corrugated cardboard, wood, or the like, have a substantially rectangular cross section. Interior wall casing 58 is held in place by nailing strips 60, 61, 62, and 63 which run the length of interior wall casing 58 along the bottom and top of left surface 64 and right surface 66 and are nailed to conventional deck 14 and conventional ceiling structural members by plurality of nails 68 and 70. Left surface 64 and right surface 66 or room facing wall surface may be covered by an interior wall surface or room facing wall surface covering such as a layer of gypsum paper 72 or the like to provide improved paint adhesion characteristics, sound deadening, etc. Interior wall casing 58 may be filled with either an insulating material such as a hardenable foam insulation (not shown) if it is to form a non-load bearing wall or a load bearing material such as light-weight concrete 71 if it is to form a load bearing wall. A 2"×4" segment of lumber 74 runs the length of interior wall casing 58 and is set into foam insulation or light-weight concrete 71 before it hardens. As with any of the hardenable material incorporated in the inventive building, load bearing or insulating material such as concrete 71 may include tensile reinforcement and stress absorbing fibers, metal strands, or the like to enhance the materials properties.

Conventional roofing 19 may be secured to inventive building 10 by nails 73 or the like. Also shown are structural ribs 262 and 264.

Figure 2:
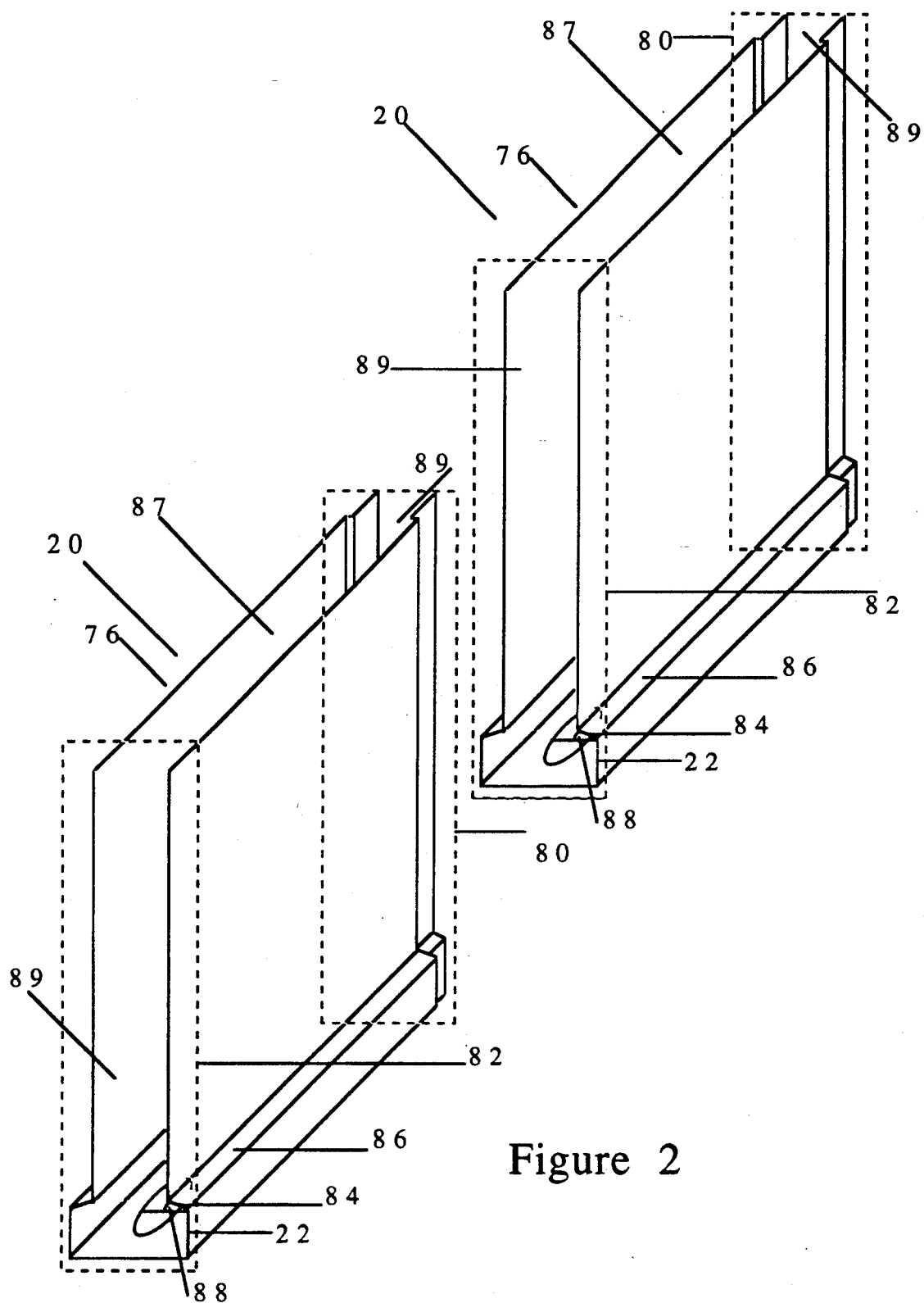
FIG. 2 is a perspective view of two straight foundation casing members of the inventive building.
Figure 3:
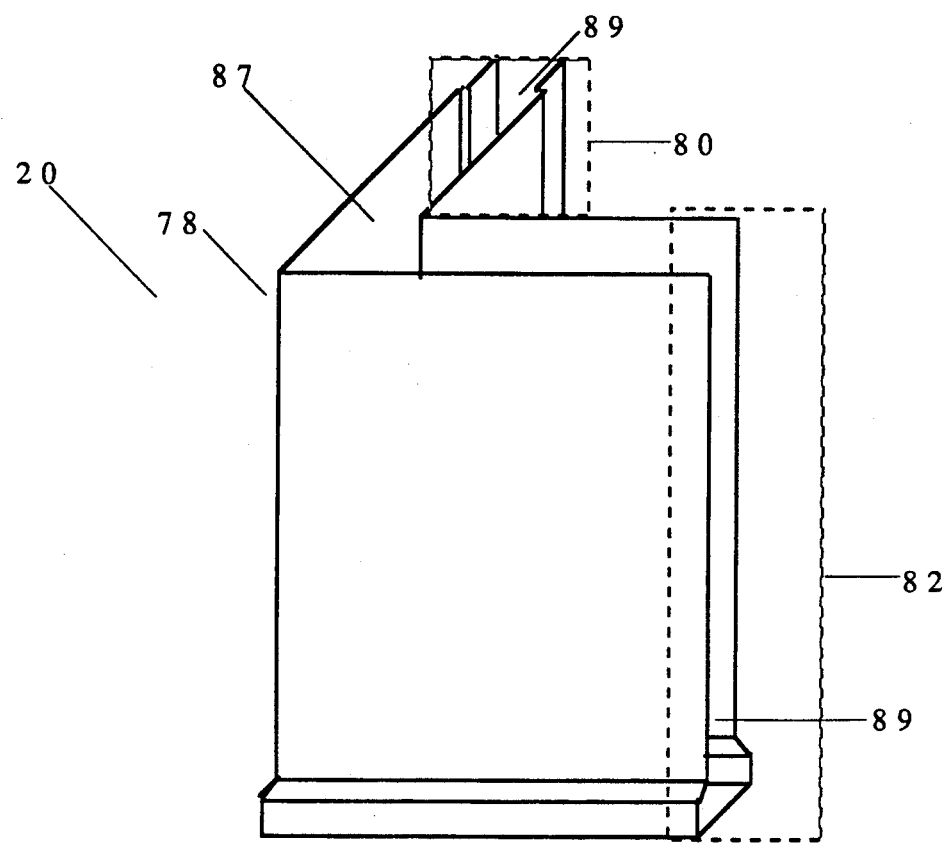
FIG. 3 is a perspective view of a curved foundation casing member.

Referring to FIGS. 2 and 3, foundation system 12 includes a plurality of straight foundation wall casings 76 and curved foundation wall casings 78. Preferably, the curve is 90 degrees. Preferably, each foundation wall casing 76 and 78 has a height of 8 feet, a width of 10 inches, and a length of 8 feet. The height does not include base 22. Each of straight foundation wall casings 76 and curved foundation wall casings 78 is terminated at one end by male-joining section, represented by section enclosed in dashed line box 80 and at the other end by female-joining section, represented by section enclosed by dashed line box 82. Male-joining section 80 has the same cross-section shape as female joining section 82 but is configured and dimensioned so that female-joining section 82 of one foundation wall casing 76 engagingly accepts male-joining section 80 of another foundation wall casing 76 or 78. Base 22 of foundation casings 20 forms a footing for anchoring foundation in the earth. Preferably, base 22 has a height of 12 inches and a width of 20 inches. Top portion 84 of base 22 defines a surface 86 oriented at an acute angle 88 with respect to the horizontal to prevent any air from being trapped during the filling of foundation wall casings 20. The preferred angle 88 is on the order of 20 degrees. During construction of foundation 12, a plurality of straight foundation wall casings 76 and/or curved foundation wall casings 78 are joined to form a continuous perimeter. Concrete (not shown) is introduced into foundation casing 20 though top opening 87 of foundation casing 20 and flows through end opening 89 of joined foundation casings 20 to form a substantially continuous mass of concrete.

Figure 4:
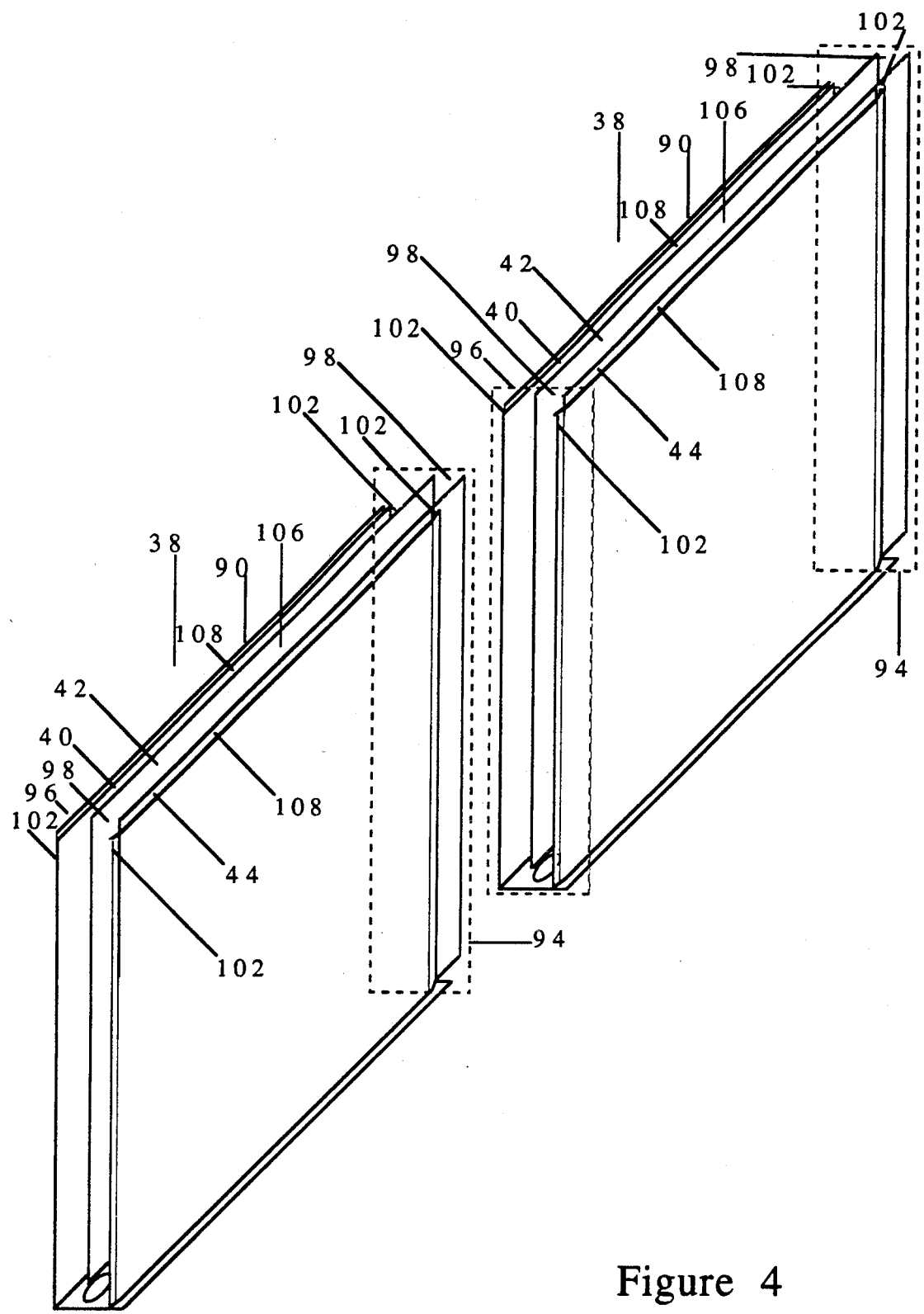
FIG. 4 is a perspective view of two straight exterior wall casing members of the inventive building.

Referring to FIG. 4, exterior wall system 16 of inventive building 10 includes a plurality of straight exterior wall casings 90 and curved exterior wall casings 92 (shown without the ribs depicted in FIGS. 19–22). Curved exterior wall casings 92 (shown in FIG. 6) are curved in a manner similar to curved foundation wall casings 78 shown in FIG. 3, except have the features of straight exterior wall casing 90 shown in FIG. 4. Preferably, each exterior wall casing 90 and 92 has an overall height of 8 feet, an overall width of 8 inches, and an overall length of 8 feet. These dimensions, as with all dimensions pertaining to the invention can be varied to suit the application. The length does not include length of extended male-joining section 94. Each of straight exterior wall casings 90 and curved exterior wall casings 92 is terminated at one end by male-joining section, represented by the section enclosed in dashed line box 94 and at the other end by female-joining section, represented by the section enclosed in dashed line box 96.

Figure 24:
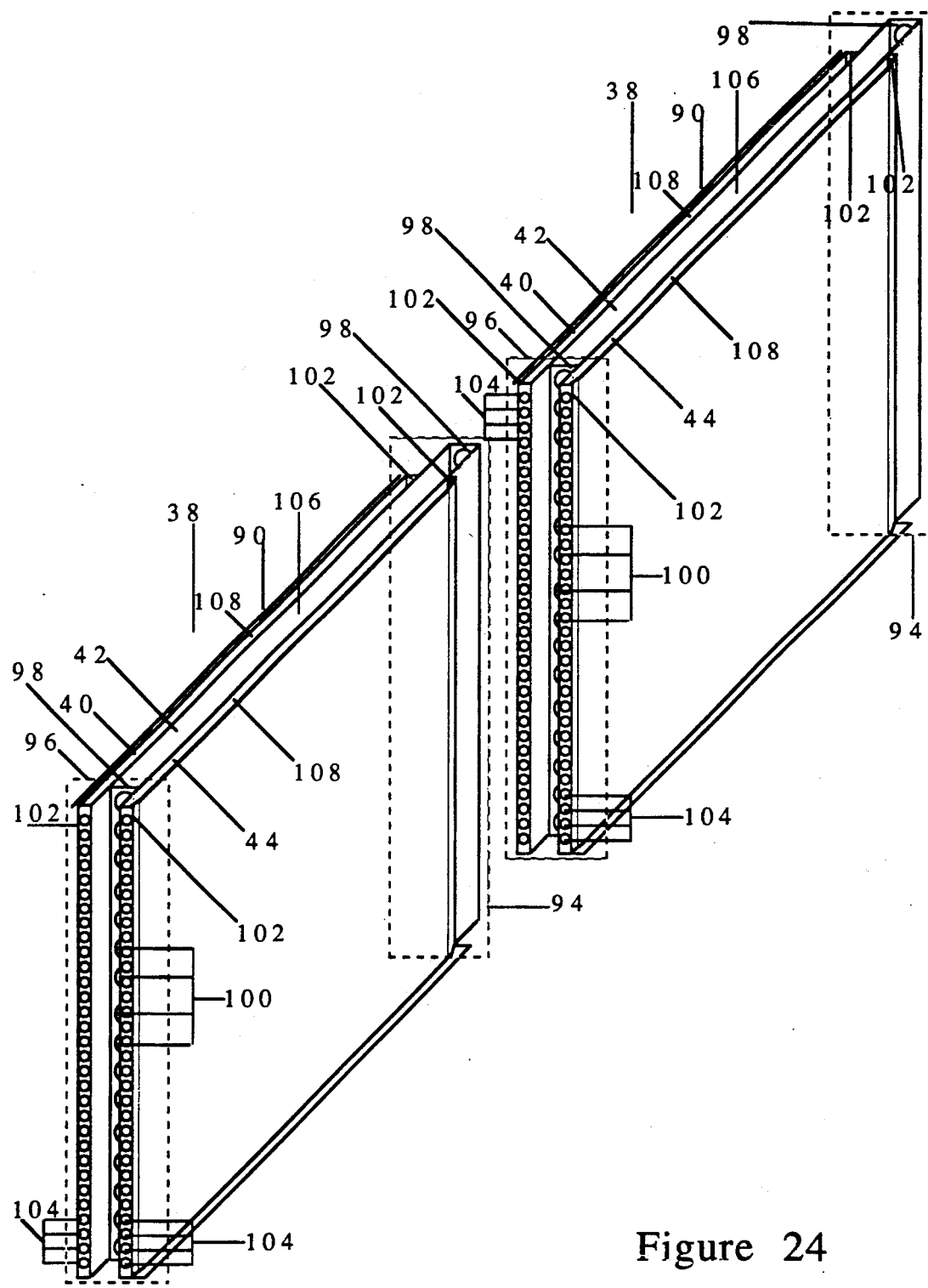
FIG. 24 is a perspective view depicting an alternative general construction of a casing.

In an alternative embodiment, shown in FIG. 24, at the male-joining section 94 end of exterior wall casing 38, middle section 42 of each of the respective exterior wall casings 38 extends from exterior wall casing 38 and at female-joining section 96 end of exterior wall casing 38, exterior section 40 and interior section 44 extend from exterior wall casing 38. Preferably, middle section 42 extends a length of 6 inches and exterior section 40 and interior section 44 extend a corresponding length. Middle section 42 terminates at both ends by walls 98, each wall 98 having a plurality of holes 100 disposed in it, preferably holes 100 have a diameter of 3.5 inches. Holes 100 of female joining section 96 line up with the respective holes 100 of male joining section 94 when two exterior wall casings 38 are joined. In like manner, exterior section 40 and interior section 44 terminate at both ends by walls 102, each wall 102 having a plurality of holes 104 disposed on it, preferably holes 104 have a diameter of 1.5 inches. During construction of inventive building 10, a plurality of straight exterior wall casings 90 and/or curved exterior wall casings 92 are joined to form a substantially continuous perimeter. Foam insulation (not shown) is introduced into middle section 42 though top opening 106 of middle section 42 and flows through holes 100 of joined exterior wall casings 38 to form a continuous mass of foam insulation. In a like manner, light weight concrete (not shown) is introduced into exterior section 40 and interior section 44 through top opening 108 and flows through holes 104 of joined exterior wall casings 38 to form a substantially continuous masses of light weight concrete. Preferably, exterior section 40 and interior section 44 have a width of 2 inches, and middle section has a width of 4 inches.

Figure 5:
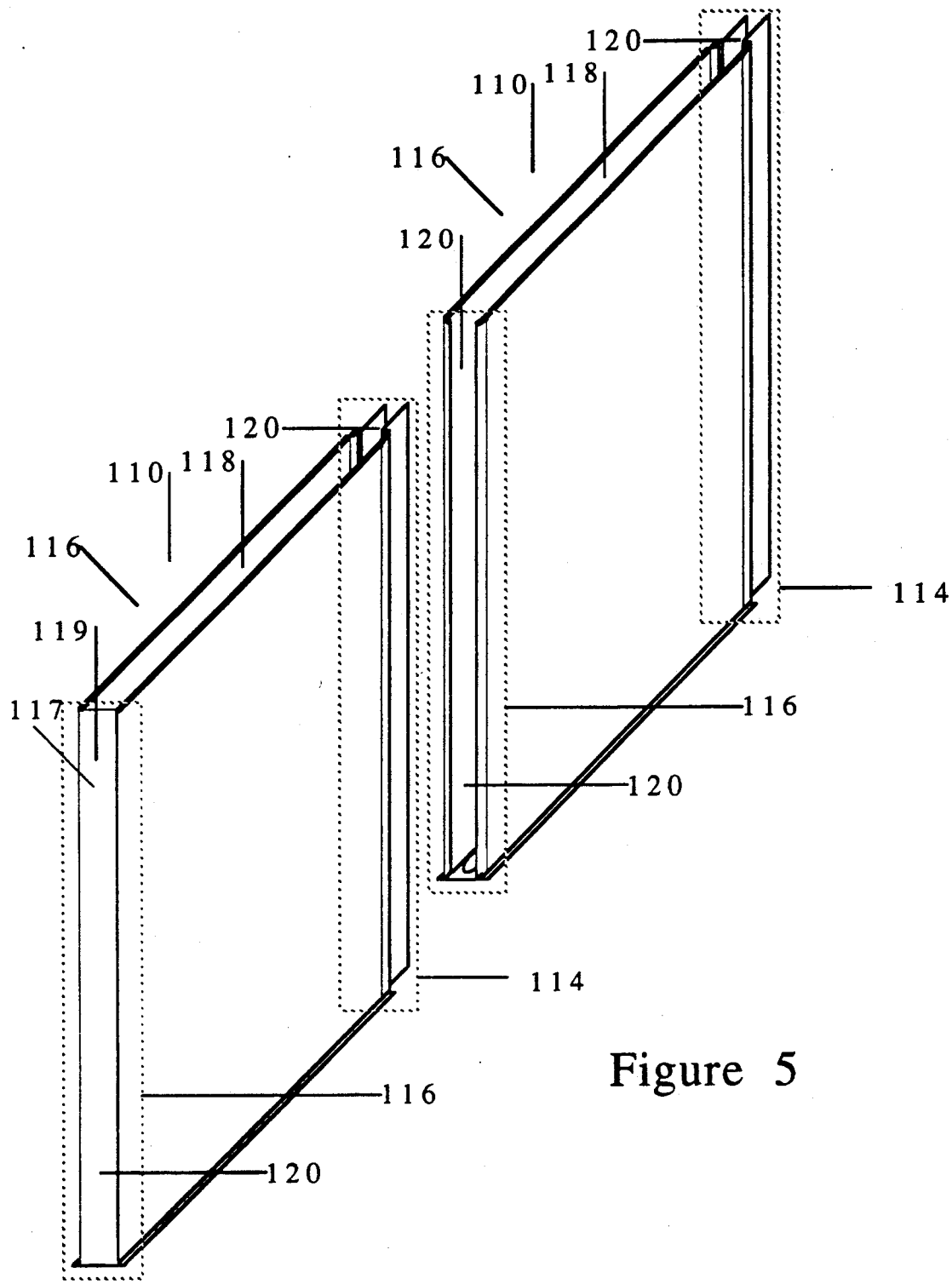
FIG. 5 is a perspective view of two straight interior wall casing members of the inventive building.

Referring to FIG. 5, interior wall system 18 is comprised of a plurality of straight interior wall casings 110 and/or curved interior wall casings. Curved interior wall casings (not shown) are curved in a manner similar to curved foundation wall casings 78 shown in FIG. 3, except have the features of straight interior wall casing 110 shown in FIG. 5. Preferably, each interior wall casing 110 has a height of 8 feet, a length of 8 feet, and a width of 4 inches. Each of straight interior wall casings 110 and curved interior wall casings is terminated at one end by male-joining section, represented by section enclosed in dashed line box 114 and at the other end by female-joining section, represented by section enclosed in dashed box 116. Male-joining section 114 has the same cross-section shape as female joining section 116 but is configured and dimensioned so that female-joining section 116 of one interior wall casing 110 or engagingly accepts male-joining section 114 of another interior wall casing 110 or. Nailing strips 60, 61, 62, and 63 are nailed into structural members of conventional deck 14 and conventional ceiling and help secure interior wall system 18 in place. Interior wall system 18 partitions and creates separate rooms in the space enclosed by the perimeter of exterior wall system 16. The location, number, shape, and length of interior wall systems 18 is dependant on design considerations. During construction of interior wall system 18, a plurality of straight interior wall casings 110 and/or curved interior wall casings are joined to form interior wall system 18 sections. Light weight concrete or foam insulation (not shown) is introduced into interior casing 110 though top opening 118 of interior casing 110 and flows through end opening 120 of joined interior wall casings 110 to form a substantially continuous mass of concrete. Some of interior wall casings 110 terminate at one end in butt-end 117, butt-end 117 has solid wall 119. On either end of a plurality of joined interior casings 110 is an interior wall casing with a butt-end 117. Solid wall 119 retains unhardened concrete or foam insulation and provides a glue surface with which to adhere an interior wall system 18 section to another interior wall system 18 section or an exterior wall system 16 section.

Referring to FIGS. 1 through 6, the preferred construction method of the inventive building system 10 includes the steps of: (i) constructing foundation system 12, (ii) building conventional deck 14, (iii) erecting exterior wall system 16, (iv) erecting interior wall system 18, and (v) erecting conventional roof 19. General details of these steps will be discussed below. A detailed explanation of additional construction steps will follow.

The preferred construction method for the inventive foundation system 12 includes the steps of: (i) excavating a necessary area, (ii) applying an adhesive to the surface of male-joining section 80 of one foundation case 20 that come in contact with the surfaces of female-joining section 82 of another foundation case 20, (iii) joining male-joining section 80 and female-joining section 82, (iv) continually joining straight foundation wall cases 76 and/or curved foundation wall cases 78 to create a continuous foundation system 12 with a continuous top opening 87 and having a desired shape and perimeter within the excavated area, (v) filling foundation system 12 with a load bearing material such as light-weight or conventional concrete 28 and allowing the load bearing material to set, (vi) back filling earth 24 inside the perimeter of foundation system 12 to substantially bury base 22, (vii) disposing a layer of crushed stone 34 or the like within the perimeter, (viii) laying a damp-proof plastic liner 33 or the like over crushed stone 34 and securing edges of plastic liner 33 to the interior wall of foundation system 12, (ix) pouring and smoothing concrete floor 36 in a conventional manner, (x) back filling earth around the perimeter to a desired height.

Once concrete 28 has set, conventional deck 14 is built on and supported by foundation system 12. Two rows of spikes 37 are driven along the perimeter of conventional deck 14 at locations that will line up with some of holes 122 at the bottom of exterior wall system 16. Preferably, red-rosen paper 15 or the like is laid over conventional deck 14 to act as a vapor barrier and help insulate the building. Preferably, floor plan 15' is printed on red-rosen paper 15 to facilitate the placement of the construction elements, simplifying the construction process while reducing the chance of error and waste.

After conventional deck 14 has been constructed and red-rosen paper 15 has been laid, exterior wall system 16 is erected. The preferred method of erecting exterior wall system 16 includes the steps of: (i) applying adhesive to surfaces of male-joining section 94 of exterior wall case 38 that comes in contact with female-joining section 96 of another exterior wall case 38, (ii) joining male-joining section 94 of one exterior wall case 38 with female-joining section 96 of another exterior wall casing 38, (iii) continually joining in a like manner straight exterior wall cases 90 and curved exterior wall cases 92 to create a continuous exterior wall system 16 with a continuous exterior section 40, continuous middle section 42, and continuous interior section 44 and having a desired shape and perimeter so that said perimeter is substantially the same as the perimeter of conventional deck 14 and all of spikes 37 pass through some of hole 122 at the bottom of exterior wall system 16, (iv) nailing nailing strip 46 to conventional deck 14, (v) filling middle section 42 with an insulating material such as foam insulation 54, (vi) filling exterior section 40 and interior section 44 with a load bearing material such as light-weight concrete 53, (vii) setting a plurality of lumber segments, such as 2"×4" segments of lumber 56 in light-weight concrete 53 and allowing light-weight concrete 53 to set. The load bearing material surrounds spikes 37 and oozes out of holes 122 at bottom of exterior wall system 16 and once set, securely anchors exterior wall system 16 to conventional deck 14. The preferred method of filling light-weight concrete is to use a concrete foamer and pump such as that made by Mearle Crete. The light-weight concrete thus made is known as a cellular concrete. The ratio of air to concrete and hence the density of the load bearing material is a design consideration to be determined depending on factors such as the anticipated load to support and an adequate safety factor. An example density for a single story structure is on the order of 200 lb/in.

After exterior wall system 16 has been erected, interior wall system 18 is erected. The preferred construction method of erecting interior wall system 18 includes the steps of: (i) applying an adhesive to the surfaces of male-joining section 114 of one interior wall case 58 that come in contact with the surfaces of female-joining section 116 of another interior wall case 58, (ii) joining male-joining section 114 of one interior wall case 58 and female-joining section 116 of another interior wall case 58, (iii) continually joining straight interior wall cases 110 and/or curved interior wall cases until a desired interior wall system 18 section is created, (iv) applying an adhesive to butt end section 117 at the terminating interior wall system 18 section and bringing said butt end section 117 into contact with the planar surface of another interior wall 18 or exterior wall system 16 at a desired location to achieve partitioning of the interior of the inventive building system 10, (v) nailing bottom nailing strips 60 and 62 to conventional deck 14, (vi) filling interior wall system 18 with either a load bearing material, such as light-weight concrete 71 or a sound insulating material, such as foam insulation. The choice of which depends on the application of the particular interior wall system 18 section. If the particular interior wall system 18 section is to be load supporting member of inventive building system 10 then the preferred choice is light-weight concrete, if the particular interior wall system 18 section is to be a non-load bearing member of inventive building 10 then the preferred choice is sound insulating material such as foam insulation, (vi) finally, a plurality of segments such as 2"×4" segments of lumber are set into foam insulation or light-weight concrete 71.

After interior wall system 18 has been erected, conventional roof 19 is built on and supported by exterior wall system 16 and load bearing members of interior wall system 18. Nailing strips 61 and 63 are nailed into supportive members of conventional ceiling before sheet-rock sections are hung on ceiling.

In the case of a multiple storied structure, substantially the same steps as those followed after the construction of foundation system 12 are repeated except additional decks are built on and supported by exterior wall system 16 and load bearing members of interior wall system 18 that are incorporated in the floor below. Conventional roof 19 is built on and supported by exterior wall system 16 and load bearing members of interior wall system 18 incorporated in the top most story.

Figure 7:
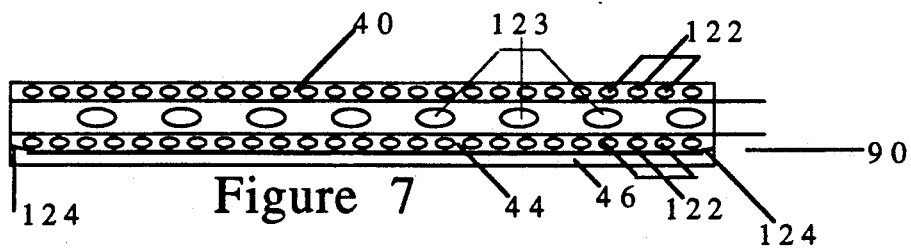
FIG. 7 is a bottom plan view of a straight exterior wall casing member.
Figure 8:
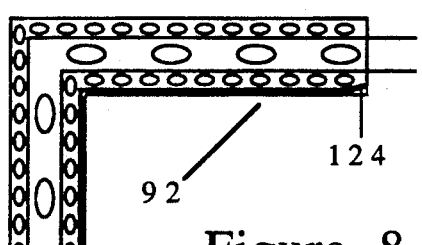
FIG. 8 is a bottom plan view of a curved exterior wall casing member.
Figure 9:
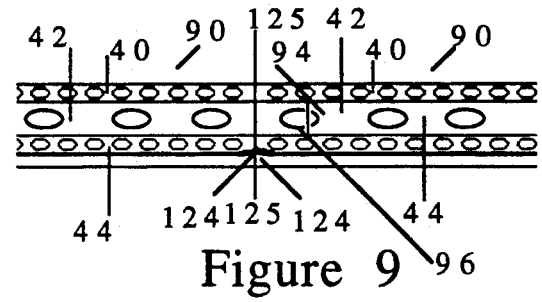
FIG. 9 is a bottom plan cut away view of a male joining section and female joining section of two exterior wall casing members joined together.

Referring to FIG. 7, straight exterior wall casing 90 has a plurality of holes 122 and 123 along the length of the bottom of the exterior section 40 and interior section 44. Holes 122 are positioned and dimensioned to accept spikes 37 nailed into conventional deck 14. Holes 122 and 123 also allow some of the light-weight concrete to ooze out and adhere exterior wall casing 90 to conventional deck 14. Nailing strip 46 secures exterior wall casing 90 to conventional deck during the assembly and filling stages of construction. FIG. 8 is a top plan view of curved exterior wall casing 92. In the preferred embodiment of inventive building 10, the angle of curved exterior wall casings 92 is substantially 90 degrees so that the perimeter formed by an exterior wall system 16 incorporating four curved exterior wall casings 92 is substantially rectangular. FIG. 9 is a top plan cut away view of the joining of two exterior wall casings 90. Male-joining section 94 of one exterior wall casing 90 is engagingly accepted by female-joining section 96 of another wall casing 90. Foam insulation flows from middle section 42 of one exterior wall casing 90 to middle section 42 of the other exterior wall casing 90 and forms substantially a continuous mass of foam insulation. Similarly, light-weight concrete flows from the exterior section 40 and interior section 44 of one exterior wall casing into the exterior section 40 and interior section 44, respectively, of the other exterior wall casing 90 and forms substantially a continuous mass of light-weight concrete in the exterior sections 40 and substantially a continuous mass of light-weight concrete in the interior sections 44. Interior edges 124 are tapered inward so that the seam 125 formed by joined exterior wall casings 90 can be easily taped and filled in a conventional manner with paper tape and joint compound or the like. The preferred taper of each interior edge is ⅛ inch inward relative to the plane in which exterior wall lies and has a width of 1.5 inches.

Figure 10:
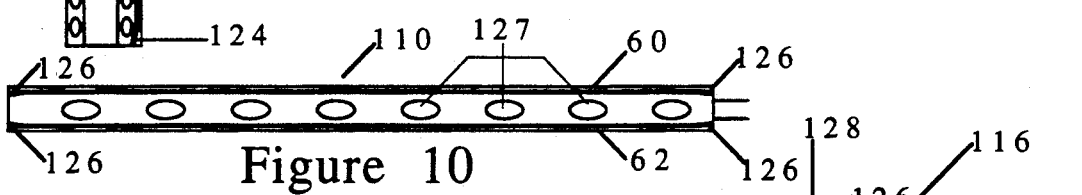
FIG. 10 is a bottom plan view of a straight interior wall casing member.
Figure 11:
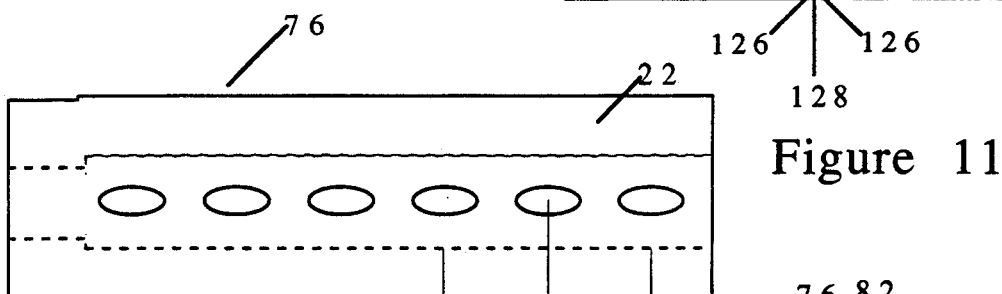
FIG. 11 is a bottom plan cut away view of the male joining section and female joining section of two interior wall casing members joined together.

FIG. 10 is a top plan view of straight interior wall casing 110. Straight interior wall casing 110 has nailing strips 60, 61, 62 and 63 for securing interior casing 110 to conventional deck 14 and conventional ceiling. A plurality of holes 127 allow some of the fill material to ooze out and adhere interior wall casings 110 to the conventional deck 14. Curved interior wall casings (not shown) are curved in a manner similar to curved exterior wall casings 92 shown in FIG. 8, except have the features of straight interior wall casing 110 shown in FIG. 10. FIG. 11 is a top plan cut away view of the joining of two interior wall casings 110. Male-joining section 114 of one interior wall casing 110 is engagingly accepted by female-joining section 116 of another interior wall casing 110. If the interior wall being constructed is a non-load bearing wall, foam insulation can be used to fill interior wall casing 110. Foam insulation flows from one interior wall casing 110 to the the other interior wall casing 110 and forms a substantially continuous mass of foam insulation. Similarly, if the interior wall being constructed is a load bearing wall, light-weight concrete can be used to fill the interior wall casings 110. Light-weight concrete flows from one interior wall casing 110 into the other interior wall casing 110 and forms a substantially continuous mass of light-weight concrete. Edges 126 are tapered inward so that the seam 128 formed by joined interior wall casings 110 can be easily taped and filled in a conventional manner with paper tape and joint compound or the like. The preferred taper of each edge 126 is ⅛ inches inward relative to the plane in which interior wall 18 lies and has a width of 1.5 inches.

Figure 12:
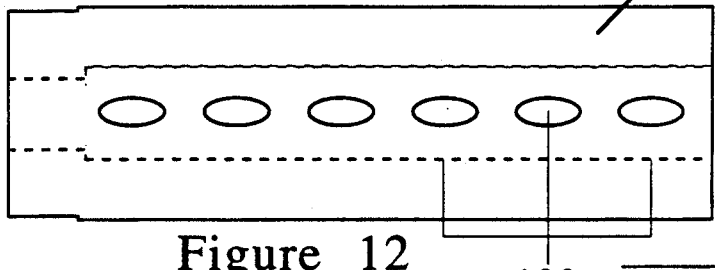
FIG. 12 is a bottom plan view of a straight foundation casing member.

FIG. 12 is a top plan view of straight foundation wall casing 76. Straight foundation wall casing 76 has base 22 for anchoring foundation casing 76 in earth 24 (not shown). A plurality of holes 129 allow some of the fill material to ooze out and help anchor the foundation system 12. Curved foundation wall casings 78 (FIG. 6) are curved in a manner similar to curved interior wall casings 92 shown in FIG. 8, except have the features of straight foundation wall casing 76 shown in FIG. 12.

FIG. 13 is a top plan view of the joining of two foundation wall casings 76. The male joining section 80 of one foundation wall casing 76 is engagingly accepted by female joining section 82 of another foundation wall casing 76. As with the joining of exterior wall casings 90 and interior wall casings 110, glue 130 may be applied to overlapping surfaces 130 before joining to insure the integrity of the joint. Concrete is poured into foundation wall casing 76 and flows from one foundation wall casing 76 to the the other foundation wall casing 76 and forms a continuous mass of concrete. In construction of foundation system 12, a perimeter is formed by joining a plurality of straight foundation casings 76 and curved foundation casings 78. Concrete is poured into the perimeter at various points to ensure an even distribution and a substantially continuous mass of concrete.

Figure 14:
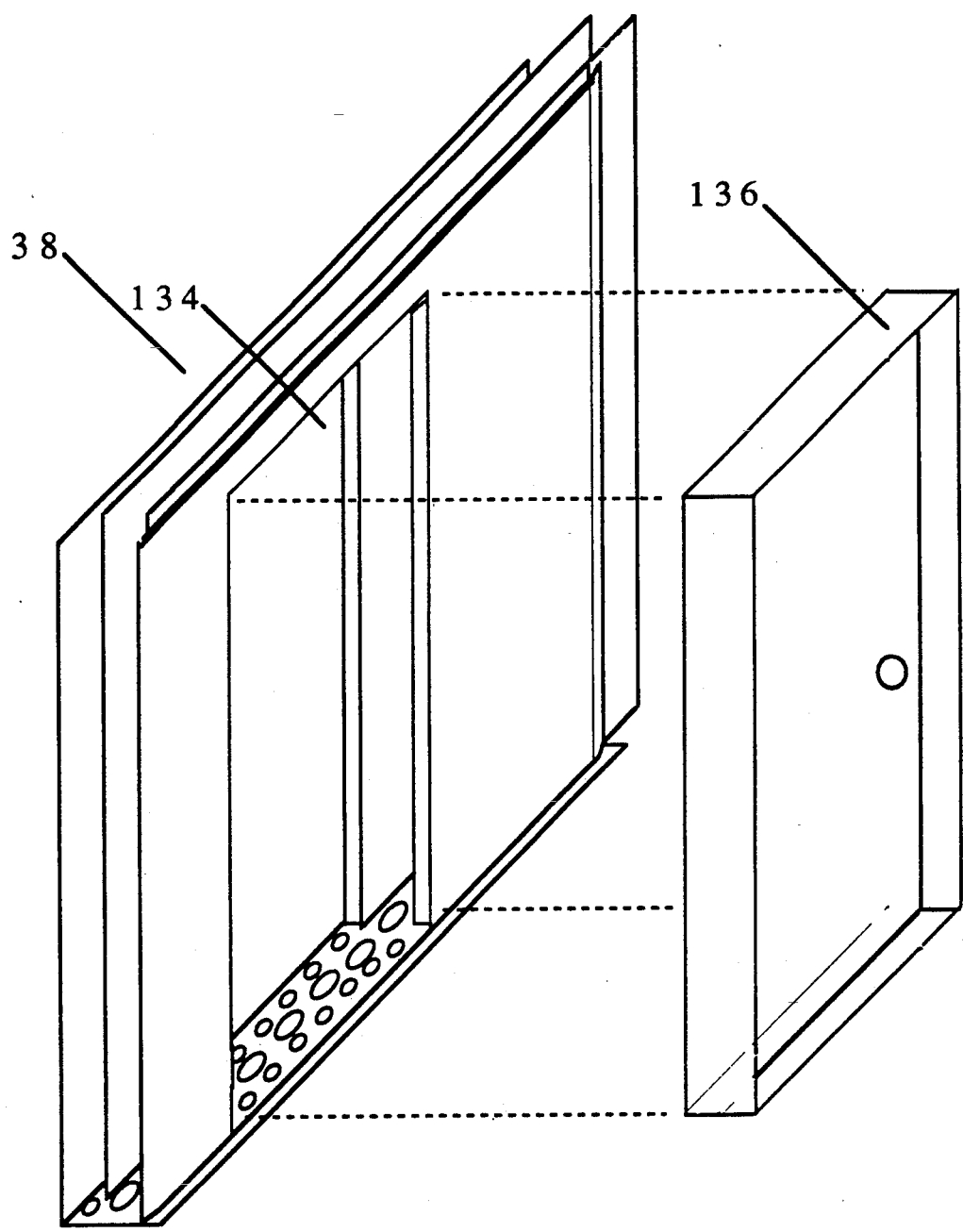
FIG. 14 is a perspective view of a straight exterior wall casing member and pre-hung door.

Referring to FIG. 14, cut-out 134 is made in exterior wall casing 38 to accept pre-hung door 136. Cut-out 134 can be made using a chain-saw, skill saw, razor blade or other suitable cutting instrument. Cut-out 134 can be made either before or after exterior wall casing 38 is filled with foam insulation and light-weight concrete. If cut-out 134 is made before filling exterior wall casing 38, pre-hung door 136 is set in place inside cut-out 134 and foam insulation and light-weight concrete fills in around the framing of pre-hung door 136, securing it in place. Windows are placed in exterior wall casing 38 in a manner similar to that of pre-hung door 136. Pre-hung doors are also placed in interior wall casings 110 in a similar manner. By selecting the proper materials from which to construct the construction elements, all scrap material generated from cut-outs, as with most of the scraps generated during the preferred construction method, preferably are shredded and used as insulative fill. Vastly reducing the wastes generated as compared with conventional construction methods.

Figure 15:
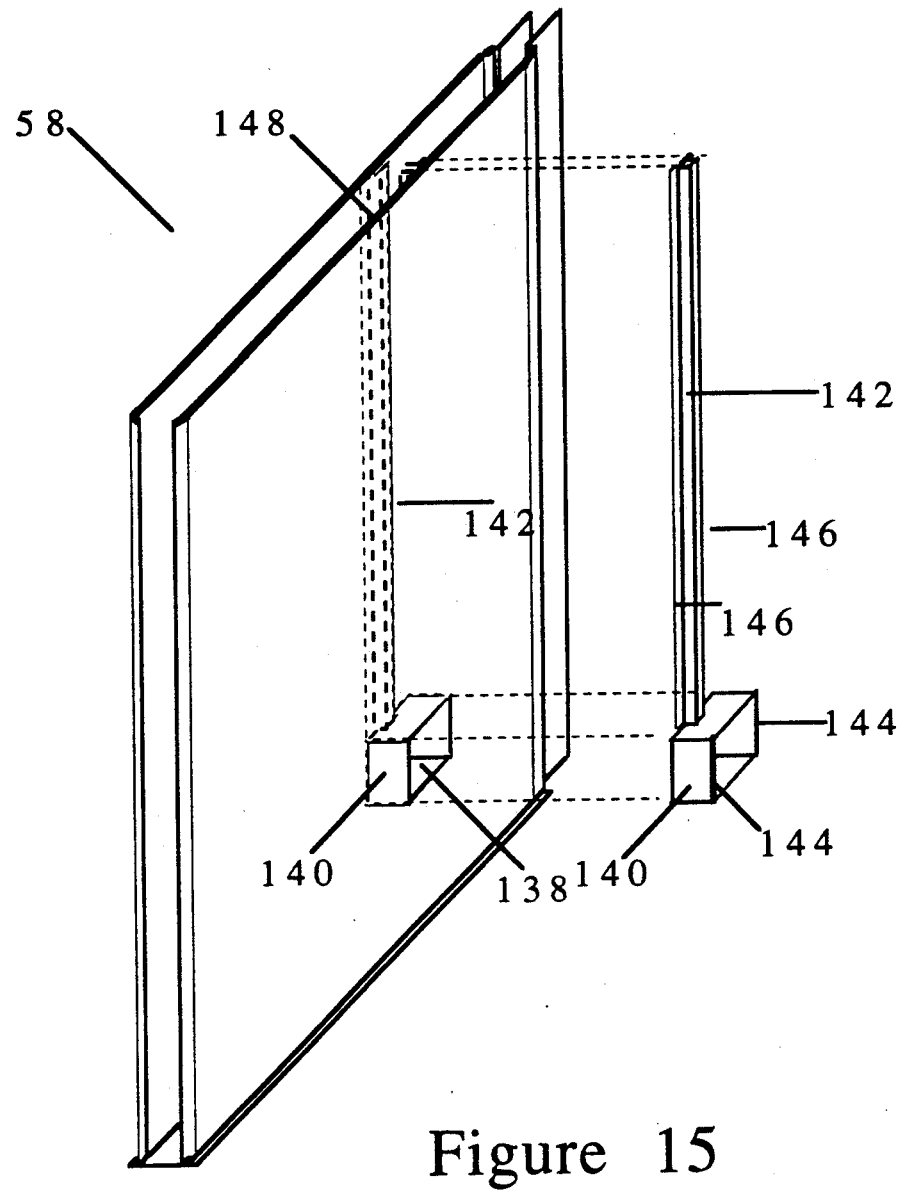
FIG. 15 is a perspective view of a straight interior wall member and inventive electrical gang-box and conduit.

Referring to FIG. 15, cut-out 138 is made in interior wall casing 58 to accept gang-box 140. Cut-out 138 can be made using a chain-saw, skill saw, razor blade, or other suitable cutting instrument. Conduit 142 for sheathing and protecting wiring is set back from inside surface 148 of interior wall casing 58 to protect wiring from accidental contact with foreign items which may latter be inserted in wall, such as a nail hammered into the wall. Glue flange 146 may be used to secure conduit 142 during construction. Gang-box 140 for enclosing conventional electrical switches and electrical plugs is secured to inside surface 148 of interior wall casing 58 by an adhesive, such as glue, double sided tape, or the like, applied to glue-flanges 144. The bond between glue-flanges 144 and 146 and inside surface 148 of interior wall casing 58 prevents fill material from leaking through cut out 138 or moving the position of conduit 142 and gang-box 140 during the pouring of foam insulation or light-weight concrete into interior wall casing 58. Gang-box 140 and conduit 142 are retained in place by hardened foam insulation or light-weight concrete. All scrap material resulting from cut-out 138 may be shredded to be used as insulation fill. Gang-boxes 140 and conduits 142 are placed in foundation wall casings 20 and exterior wall casings 38 in a similar manner.

Figures 16, 17, 18:
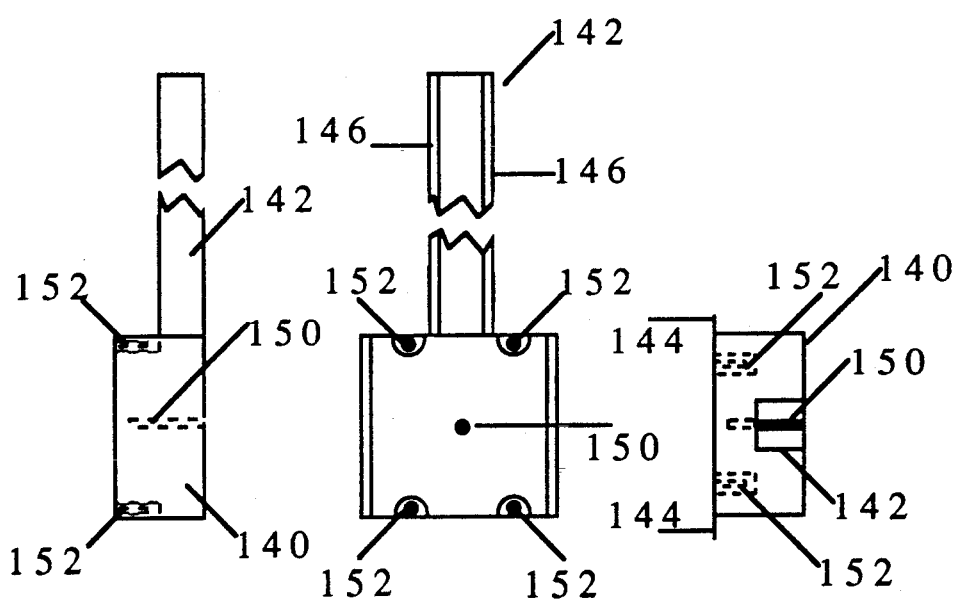
FIG. 16 is a side view of electrical gang-box and conduit.
FIG. 17 is a front view of electrical gang-box and conduit.
FIG. 18 is a top plan view of electrical gang-box and conduit.

Referring to FIGS. 16, 17, and 18, gang-box 140 has positioning stick 150 for reaching in through cut out 138 and positioning gang-box 140 and conduit 142 inside interior wall casing 58 or exterior wall casing 38. Positioning stick 150 is also used to pull gang-box 140 firmly against inside surface 148 of interior wall casing 58 or exterior wall casing 38 and insure a good bond between adhesive and inside surface 148. Positioning stick 150 may later be snapped off from gang-box 140. A conventional face plate is secured to gang-box 140 by screws screwed into screw mounts 152.

Figure 19:
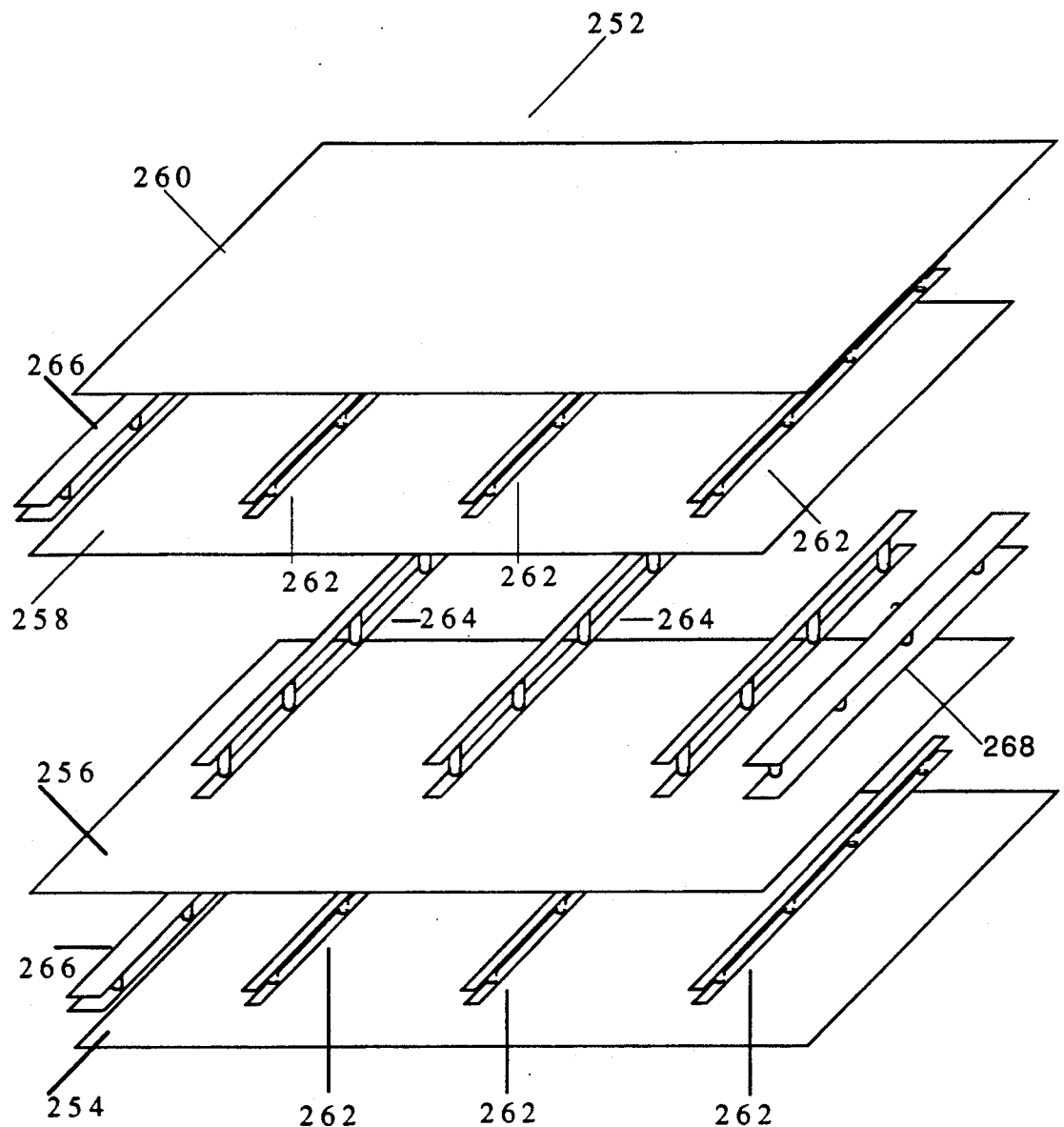
FIG. 19 is an exploded schematic representation depicting the preferred general construction of the individual casings.

Referring to FIGS. 19–22, a general construction of the individual casings is shown. In particular, FIG. 19 shows an exploded view of sandwich constructed exterior wall 252. First sheet 254, second sheet 256, third sheet 258 and fourth sheet 260 all have substantially the same dimensions and are made of a high impact plastic such as polystyrene or the like. To fabricate sandwich constructed exterior wall 252, outer structural ribs 262 and outer connecting structural rib 266 are attached to first sheet 254 by an adhesive or plastic welding. Second sheet 256 is joined to outer structural ribs 262 in like manner but its length is offset relative to first sheet 254. Inner structural ribs 264 and inner connecting structural rib 268 are joined to second sheet 256 and third sheet 258 such that the edges of third sheet 258 are substantially co-planer with the edges of first sheet 254. A second set of outer structural ribs 262 and outer connecting rib 266 are joined to third sheet 258 and fourth sheet 260 such that the edges of fourth sheet 260 are substantially co-planar with the edges of second sheet 256. Referring to FIG. 21, a constructed sandwich constructed exterior wall is shown. As an alternative, the sheets, for example 254–260, may be positioned, configured and dimensioned such that the respective edges of each sheet line up substantially near the center of the sheet adjacent to it in the sandwich so as to maximize the strength of the constructed structure.

Referring to FIG. 20a, an exploded view depicting the general construction of ribs 262, 264, 266, and 268 is shown. Rib base 270 has one end of rib posts 274 joined to it by a suitable adhesive, plastic welding, or the like. Rib base 272 is similarly joined to the other end of rib posts 274. FIGS. 20b–20e are isolated perspective views of outer structural rib 262, inner structural rib 264, outer connecting rib 266 and inner connecting rib 268 respectively. As shown in these Figures, connecting ribs 266 and 268 have a wider rib base than structural ribs 262 and 264. Connecting ribs 266 and 268 are positioned configured and dimensioned to join individual cases 252. When individual cases 252 are joined together, the wider bases on connecting ribs 266 and 268 over lap between and are joined to the sheets 254–260 of the respective individual cases. Rib posts 274 of outer connecting rib 266 is shorter than rib posts 274 of outer structural rib 262 to facilitate beveling of first sheet 254 and fourth sheet 260 so that there is an indentation for tape and compound thus a flat surface can be maintained spanning the length of joined cases as shown in FIGS. 9 and 11. Bottom structural member 276 has holes 222 which have the same function as holes 122 depicted in FIG. 7. Bottom structural member 276 is joined to sandwich constructed case 252 by joining flanges 278, 280, 282, and 284 with sheets 254–260. Cut outs 279 are positioned and dimensioned to accept ribs 20b–20e or alternatively, ribs may be shortened by a distance suitable to accommodate flanges 278–284 without cut-outs 279. Curved exterior wall casings similar to curved exterior wall casings 92 depicted in FIG. 8 can be constructed by this alternative method of casing construction by bending each sheet 254–260 to a desired curve.

Figure 23:
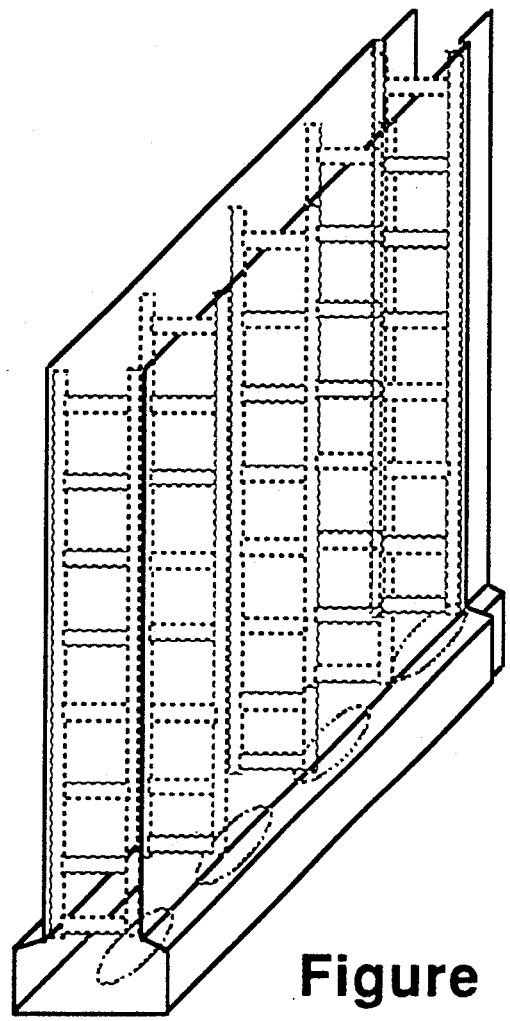
FIG. 23 is a perspective view showing a conventional foundation wall casing including ribs.

In a similar manner straight interior wall casings 110, curved interior wall casings, straight foundation wall casings 76 and curved foundation wall casings 78 can be constructed by using an appropriate number of sheets having an appropriate bend, rib members and bottom structural members having an appropriate profile. FIG. 23 is a perspective view of a foundation wall casing 76 constructed substantially as above. As shown, the bottom of the foundation wall casing 76 may have at least one through-holes which are effective to allow some of the poured load-bearing material to ooze out of the foundation casing member before hardening so as to anchor the foundation casing member 76 in the ground.

While the invention has been described with reference to a preferred embodiment, it will be understood by those skilled in the art that various changes may be made and equivalent may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodiment disclosed as the best mode contemplated for carrying out the invention, but that the invention will include embodiments falling within the scope of the appended claims.

I claim:

1. A building system comprising: a foundation system comprised of a plurality of preformed foundation casing members for forming the foundation of a building, each foundation casing member having a first side wall, a second side wall and a bottom defining a void for receiving a pourable hardenable load-bearing material therein, each of said plurality of foundation casing members having a first end and a second end, the first end configured and dimensioned such that the first end of each one of said plurality of foundation casing members is engagingly acceptable by the second end of another one of said plurality of foundation casing members so as to be interconnectable at a construction site and define a continuous void for receiving the load-bearing material poured therein at the construction site and effective to form a continuous section of hardened load-bearing material contained between two or more interconnected foundation casing members, said bottom of at least one of said foundation casing members having at least one through-hole effective to allow some of the poured load-bearing material to ooze out of the foundation casing member before hardening so as to anchor the foundation casing member in the ground.

2. A building system as in claim 1; further comprising an exterior wall casing system comprised of a plurality of interconnectable exterior wall casing members interconnectable at a construction site for forming the exterior walls of the building, said exterior wall casing system being supportable by said foundation system and each of said plurality of exterior wall casing members having a first side wall, a second side wall and a bottom defining a void; and a load-bearing material comprised of cellular concrete pourable into said void after the interconnection of the exterior wall casing members at the construction site so as to have a first portion extend in a direction from the first side wall toward the second side wall and, so as to have a second portion extend in a direction from the second side wall toward the first side wall, and an insulating material section disposed in said void between the first portion and the second portion so as to form a structure having the insulating material sandwiched between two cellular concrete load-bearing sections, thereby forming at least one wall of the building.

3. A building system as in claim 1; further comprising an interior wall casing system comprised of a plurality of interior wall casing members for forming the interior walls of a building, said interior wall casing system being supportable by said foundation system and each of said plurality of interior wall casing members having a first side wall, a second side wall and a bottom defining a void for receiving at least one of a load-bearing material and an insulating material therein.

4. A building system as in claim 1 wherein each of said foundation casing members is further comprised of a set of sheet members forming said first and second walls and a plurality of rib members connected between said sheet members.

5. A building system according to claim 1; wherein the load-bearing material comprises cellular concrete.

6. A building system according to claim 1; wherein the casing members are comprised of a polymer.

7. A building system according to claim 1; wherein the performed interconnectable casing members comprise a fire retardant plastic.

8. A building system according to claim 1; wherein each preformed interconnectable casing member has a room facing wall surface forming an interior exposed wall surface of the wall of the building; and further comprising a sheet of room facing wall surface covering adhered to the room facing wall surface.

9. A building system according to claim 1; wherein the load-bearing material includes tensile reinforcement material.

* * * * *